Dec. 3, 1968    A. A. POLLIA    3,414,297
PIPE COUPLING CONTAINING A DETACHABLE FLANGE
Filed April 9, 1965    2 Sheets-Sheet 1

INVENTOR.
ANDREW A. POLLIA
BY Schapp & Hatch
ATTORNEYS

Dec. 3, 1968    A. A. POLLIA    3,414,297
PIPE COUPLING CONTAINING A DETACHABLE FLANGE
Filed April 9, 1965    2 Sheets-Sheet 2

INVENTOR.
ANDREW A. POLLIA
BY
Schapps & Hatch
ATTORNEYS

United States Patent Office 3,414,297
Patented Dec. 3, 1968

3,414,297
PIPE COUPLING CONTAINING A
DETACHABLE FLANGE
Andrew A. Pollia, San Francisco, Calif., assignor to
Raphael T. Pollia, San Francisco, Calif.
Filed Apr. 9, 1965, Ser. No. 446,983
6 Claims. (Cl. 285—98)

ABSTRACT OF THE DISCLOSURE

A pipe coupling suitable for high pressure flanged pipe connections comprising at least one flanged pipe end which has a removable thrust flange ring and a sealing retainer ring adapted to abut the flange and provide a channel therebetween; a key formed to fit within said channel and into a pair of grooves formed on two opposed sides of the pipe within a common circle on the outer surface thereof; said sealing retainer ring being formed to provide an annular recess around the pipe end and open at the side toward the pipe end when in assembled position on the pipe, the annular recess also being bevelled outward at the open end; and a generally ring-shaped sealer composed of resilient material adapted to fit tightly within the annular space, said sealer having a substantially uniform tear-shaped cross-section adapted to fit with one side of the tear against the pipe.

---

Figure 1:
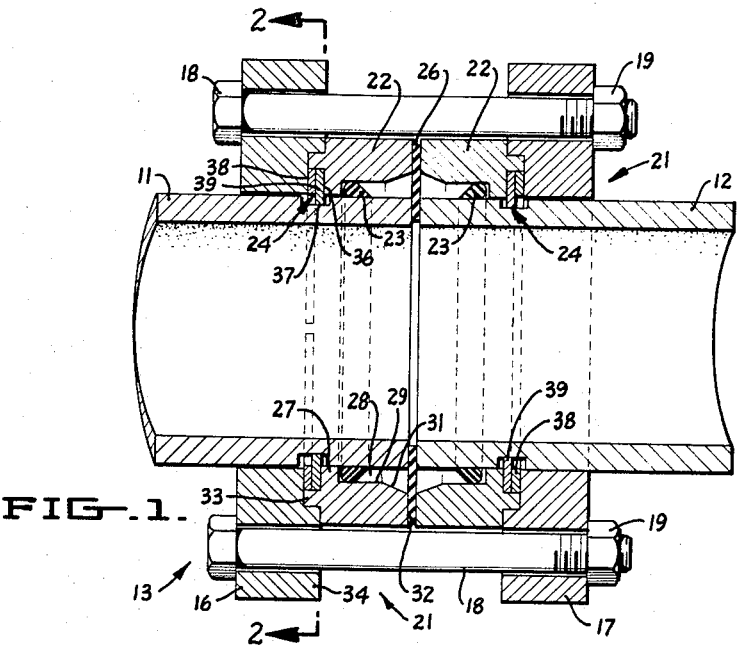

The present invention relates to improvements in a pipe coupling containing a detachable flange and a method and apparatus for assembling same, and more particularly to such a pipe coupling which has the capability of allowing expansion and contraction of the pipe together with relative rotation or swivel movement between the pipe and the coupling.

Various pipe couplings of the character described above have been developed and certain of these are described and claimed in my United States Patent Nos. 2,784,990, 2,867,454 and 3,085,820. The present invention is an improvement over these couplings and contains a structure which provides an improved sealing and retainer system.

Accordingly, it is a primary object of this invention to provide an improved coupling which is capable of compensating for relative rotation between the pipe and coupling and also for expansion and contraction of the pipe itself with a relatively simple coupling capable of easy installation and suitable for use in high pressure systems.

Another object of the invention is to provide a coupling of the character described which is made with a minimum of parts, yet which provides an improved seal.

Another object of the invention is to provide a method for installing the coupling of this invention in which the coupling is positively retained in correct alignment and the sealing members are carefully and firmly forced into proper position.

Yet another object of the invention is to provide a method of assembling the coupling of this invention which utilizes auxiliary equipment especially constructed for the assembly and which provides an excellent and accurate job in a rapid and efficient manner.

A still further object of the invention is to provide a coupling having an improved seal and an improved sealing retainer ring structure which cooperates with the improved sealer to provide an improved coupling of the character described.

Still another object of the invention is to provide a coupling of the character described in which the coupling is retained against axial movement in a manner similar to that described in the patents cited above, and which also provides an improved key structure.

Further objects and advantages of my invention will be apparent as the specification progresses, and the new and useful features of my pipe coupling containing a detachable flange and a method and apparatus for assembling same will be fully defined in the claims attached hereto.

In general, the present invention has been developed as an improvement over the known couplings utilizing grooved slots on the ends of the pipe and a key carried within said slots and clampingly engaged during assembly of a removable flange. The sealer which has been developed is generally ring-shaped, composed of resilient material, and adapted to fit over the pipe and in close proximity thereto. At the same time, the ring-shaped sealer is adapted to fit tightly or squeezingly within a recess provided in the sealing retainer ring.

The sealing retainer ring is of special construction having the recess mentioned above formed to provide an annular space adjacent to the pipe and having one end open, preferably with a bevel of some sort at this open end so as to force the sealer therein by a wedge-like action. In this way, the sealer is forced into position without injury thereto. In addition, the generally ring-shaped sealer differs from the standard O-ring in that it has a substantially uniform tear-shaped cross-section. This tear-shaped cross-section provides a relatively flat surface on the exterior of the pipe so as to provide a better sealing engagement thereon than is obtained by an O-ring. In this way, it approximates to some extent the action of the Chevron gasket. However, this sealer has the advantage over the Chevron gasket of having a cross-section approximating a circle, with the exception of the tear-shaped end portion, and this structure is especially good for retaining high pressures. In addition, it is found that a ring of this nature is also particularly valuable in enabling relative rotation between the pipe and the coupling. Such rotation tends to tear a Chevron-type gasket apart.

It is also important in providing the coupling of the present invention that the sealing retainer ring be maintained in correct alignment at all times during the assembly of the sealer therein, and it is also important that the sealer be forced therein without non-symmetrical forces that could cause injury thereto. In addition, the sealer should be rather accurately located and the sealing retainer ring must be very accurately located with respect to the end of the pipe in the "keyed on" coupling for which this invention is specifically directed.

Accordingly, the invention also provides a special system for assembling the coupling and more particularly for assembling the sealer and sealing retainer ring. For this purpose, a special tool or clamping assembly is provided which is capable of exerting very severe clamping forces in a symmetrical manner so that the sealer may be tightly forced within the sealing retainer ring through the wedge action mentioned above. In its preferred form, this apparatus is also provided with a holding element for abutting the sealer and maintaining it in proper spaced relation with respect to the end of the pipe.

Figure 2:
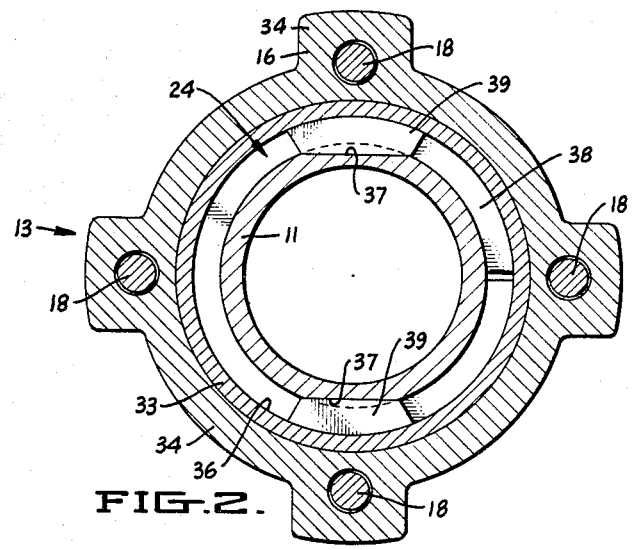
Figure 3:
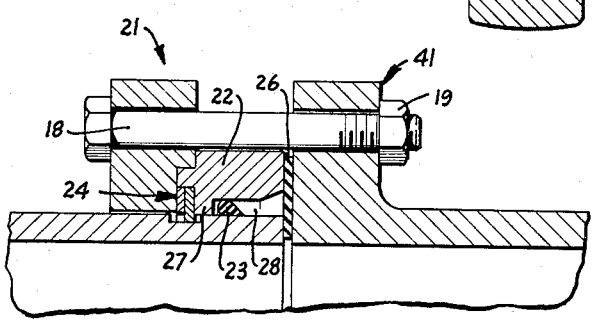
Figure 4:
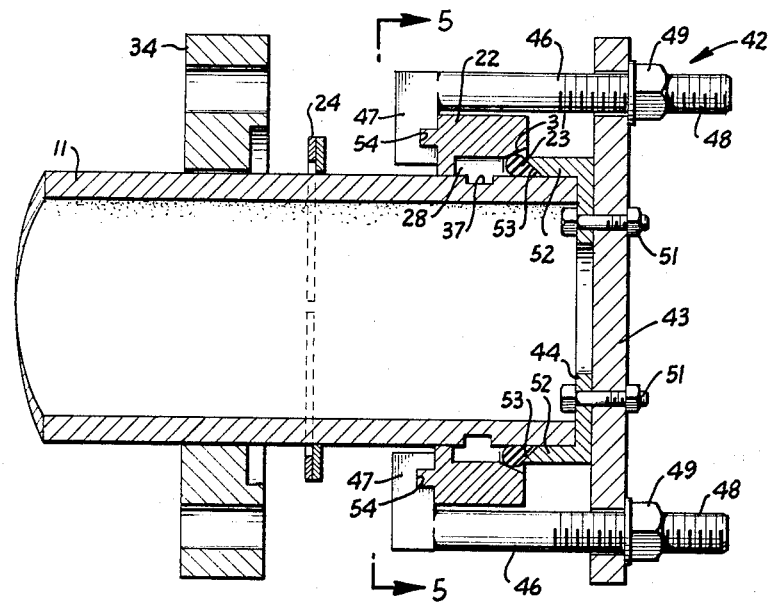

The preferred forms of the invention are illustrated in the accompanying drawings, forming a part of this description, in which FIGURE 1 shows a longitudinal section through a pipe coupling constructed according to the invention in which two pipes are coupled together;

FIGURE 2, a cross-sectional view of the pipe coupling shown in FIGURE 1 taken substantially in the plane of line 2—2 thereof;

FIGURE 3, an enlarged fragmentary longitudinal section illustrating the manner in which the pipe coupling of this invention is used to couple regular pipe ends against a flanged pipe and/or fitting;

FIGURE 4, a longitudinal sectional view of the pipe coupling of this invention as it appears during partial disassembly and including a preferred assembly tool (also shown in cross-section) as it appears on the pipe during the assembly of the removable flange used for coupling.

Figures 5, 6:
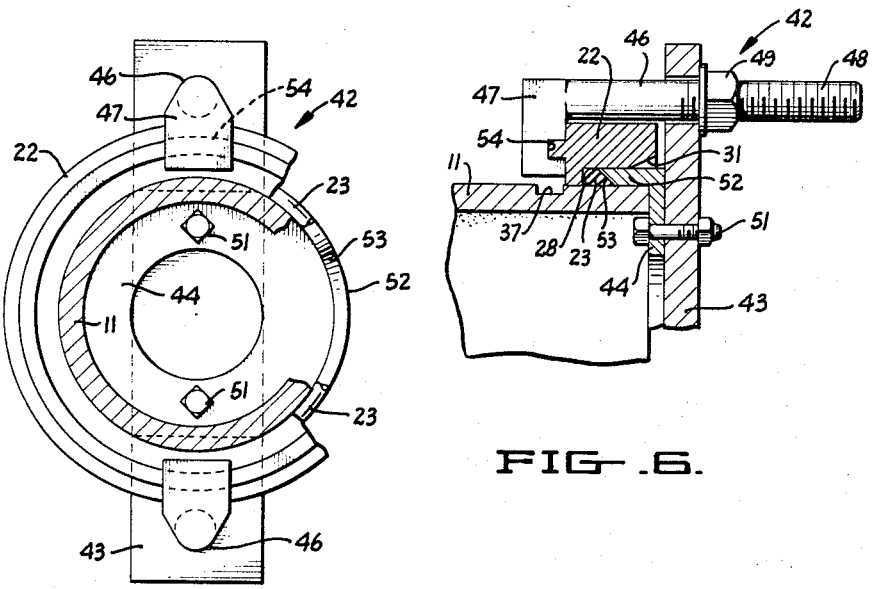

FIGURE 5, a cross-sectional view of the pipe and assembly tool shown in FIGURE 4, taken substantially in the plane of line 5—5 thereof, with parts being broken away in order to illustrate more clearly the internal structure; and FIGURE 6, a fragmentary view of the pipe assembly shown in FIGURE 4 at a later stage during assembly of the pipe.

While only certain illustrated forms of the invention have been shown, it should be understood that various changes and modifications may be made within the scope of the claims attached hereto without departing from the spirit of the invention.

Referring to the drawings in greater detail, there is shown in FIGURE 1 a pair of pipes 11 and 12 coupled together by a coupling 13 constructed according to the invention. The coupling 13 comprises a pair of flanges 16 and 17, each carried on a pipe end and bolted together in the usual way by a plurality of bolts 18 and nuts 19 symmetrically located on the flanges. In the embodiment shown in FIGURE 1, each pipe is equipped with a removable flange assembly 21 although it will be appreciated that one of the flanges may be solidly connected to the pipe or fitting, as shown in FIGURE 3.

Each removable flange assembly 21 comprises a thrust flange ring 34, a sealing retainer ring 22, a sealer 23 and a key assembly 24. The coupling itself includes a gasket 26 carried tightly between the sealing retainer rings and which also extends between the pipe ends. However, it should be understood that the gasket is tightly carried between the sealing retainer rings so that some contraction of the pipe can take place and leaking around the gasket at the pipe ends may be permitted.

Each sealer 23 is composed of resilient material such as that used for O-rings and sealing gaskets in general and the sealer is constructed to fit over the pipe and in close proximity thereto. It is an important feature of the sealer that it have a substantially uniform tear-shaped cross-section throughout and that it be placed against the pipe with the point of the tear toward the end of the coupling, as shown in the drawings. In this way, the main body of the sealer is strong and tough and the relatively smoothly machined sealer and retaining ring can rotate around the sealer without loss of pressure or injury thereto. On the other hand, a relatively flat portion of the sealer will grip into the pipe and form a tight seal thereagainst, with the tear-shaped structure tending to hold this seal and to hold the ring in the desired position. Pipe ends tend to be somewhat roughened and the construction of this sealer has particular advantage in connection with fitting against such pipes and being held in proper fixed position with respect thereto.

The sealing retainer ring is constructed with a ring-like section 27 adapted to fit in close proximity to the pipe surface, an annular recess 28 open at one end and formed by a wall 29 which is beveled at 31. The main body of the ring has thrust surfaces 32 prepared to abut the sealing gasket 26 and squeeze it against a flange or another sealing retainer ring. As here shown, the sealing retainer ring also contains a flange 33 which is adapted to fit in close relation to the walls of a recess on a thrust flange ring 34.

As shown in the drawings, the thrust flange ring 34 and the sealing retainer ring 22 come cooperatively together to form an annular recess 36 which is adapted to hold the key assembly 24 tightly in position. The pipe end carrying the removable flange assembly also has a pair of concentric grooves 37 in the surface thereof and near the end thereof so that the key assembly may fit into the grooves. The grooves are also limited in length to leave a large portion of the pipe section of full pipe thickness. As shown in the drawings, the key assembly is constructed to fit tightly in the recess 36 between the thrust flange ring and the sealing retainer ring, but the key itself is not as wide as the groove on the pipe ends so as to allow relative expansion and contraction.

In general, any type of key may be used such as any of those disclosed in the patents cited above. However, I prefer to use as the key assembly a split ring construction carrying the keys thereon and securely fastened by welding or other appropriate fastening means. Thus, the key assembly consists of a split ring 38 and a pair of keys 39 in side-by-side relation, as shown in FIGURE 1, and with the key and the split ring appearing as best shown in FIGURE 2.

In FIGURE 3, a coupling is shown in which a removable flange assembly 21 is fastened to a fixed flange 41 and this joint has the swiveling characteristics and ability to expand and contract in the same manner as the embodiment of FIGURE 1. It is possible to use this joint when connecting with other pipes or when connecting with fittings, and it is particularly valuable when making a connection with fittings.

From the foregoing description, it is seen that I have provided an improved removable flange assembly having a minimum number of parts, yet which has excellent sealing capacity achieved through a novel sealer acting in cooperation with a novel sealing retainer ring.

In view of the novel structure of the sealer and sealing retainer ring and the requirements for careful installation of the same, I have developed a special tool assembly or clamping assembly 42 which is used in the method of assembly as illustrated in FIGURES 4 through 6 of the drawings.

Briefly speaking, the present method of assembling a removable pipe flange for assembling a coupling containing the special sealing retainer ring of this invention and the special sealer of this invention comprises the steps of threading the pipe end through all elements which require axial assembly on the pipe and which fit behind the sealing retainer ring. Thus, as shown in FIGURE 4, the thrust flange ring assembly 34 and the key assembly 24 are fit over the pipe end and moved well beyond the position at which they are to be finally assembled. It will be appreciated, however, that with certain of the key assemblies such as those shown in my prior patents, only the thrust flange ring need be threaded over the pipe end because the key assembly can be applied around the pipe without the preparatory threading. The next step involves placing the sealing retainer ring 22 over the pipe end and beyond the position at which it is to be finally assembled, as shown in FIGURE 4. The sealer 23 is then placed around the pipe and within the annular recess 28 of the sealing retainer ring and against the beveled wall 31 thereof. The special tool assembly 42 is then placed on the pipe end and in engagement with the sealing retainer ring, as shown in FIGURE 4.

The special tool assembly 42 comprises a body member 43, a flanged engagement member 44, and at least two special bolts 46 having gripping lugs 47 at one end and means for moving the gripping lugs axially such as by the threads 48 and nuts 49. The body member 43 and the engagement member 44 may be made from a single piece or they may be two separate pieces bolted together by bolts 51, as shown in the drawings.

Whether or not the engagement member 44 is formed integral with the body member 43, it should have a flange 52 which fits around the exterior of the pipe to provide accurate location of the special tool assembly on the pipe end. Preferably, this flange extends around in an entirely circular fashion, although it will be appreciated that the flange could be broken up into a plurality of smaller flanges and still function to position the tool. In the preferred form, the flange 52 has an inclined abutting surface 53 adapted to fit against the special sealer 23 and hold it in accurate position as the sealing retainer ring is moved into place. In other words, the flange has an abutting surface conforming to the confronting surface of the sealer to provide maximum contact with the sealer. This construction provides for accurate placement of the sealer, as well as protection thereto during assembly.

The body member 43 has at least two diametrically opposed positions for the special bolt 46 or equivalent to pass through and thereby position the gripping lugs 47. As here shown, the gripping lugs 47 are made integral with bolts 46 and contain a recessed section 54 adapted to conform with the flange 33 on the sealing retainer ring. This construction prevents rotation of the lugs as they are pulled into place.

With the special tool assembled, it is operated to pull the sealing retainer ring toward the pipe end until the position shown in FIGURE 5 is achieved. This causes the sealing retainer ring and sealer to be placed in the correct position near the end of the pipe so that all that remains to be done is to assemble the remaining elements to complete the coupling.

Thus, after the sealing retainer ring is placed in position, the key assembly 24 is slipped over into position. With the construction here shown, it is necessary to cant the sealing retainer ring slightly to fit the keys into the concentric grooves 37 due to some slight interference by the lugs 33 on the sealing retainer ring. In some cases, it may be desirable to modify this structure and obvious modifications may be made without injury to the inventive concept illustrated herein. For example, the parts may be reversed, i.e., the lugs may be placed on the thrust flange ring and the corresponding recess put on the sealing retainer ring, or the flange may be reduced in thickness. It should be understood that when the key system shown in my prior patents and particularly the key assembly shown in United States Patent 3,085,821 is used, no problem of this nature is encountered. With the key assembly in place, the thrust flange rings are bolted into position and the final coupling is made.

It is seen that by using the method of the present invention, it is possible to positively assure correct alignment and to properly locate the seal during assembly of the coupling. In addition, it is seen that the flange 52 positively protects the sealer and prevent injury thereto during assembly.

From the foregoing description, it is seen that I have provided an improved pipe coupling utilizing at least one detachable flange system and that I have provided the same with a minimum of parts and an improved sealing system. It is also seen that I have provided an improved method incorporating a special tool for providing rapid and accurate assembly of this coupling which positively assures that a safe and reliable coupling is made.

I claim:

1. In a pipe coupling having a sealing retainer ring fitting over the end of a pipe and adapted to be held to a similar member on a connecting pipe by removable fastening means, in combination, a generally ring-shaped sealer composed of resilient material fitting over the pipe and in contact therewith, said retainer ring having walls defining an annular recess adjacent the end of said pipe, said sealer fitting within said annular recess, said sealer having substantially uniform tear-shaped cross-section formed to fit with a side of the tear against the pipe and the circular portion of the tear against the walls defining the recess in said sealing retainer ring said pipe having a roughened surface for holding the sealer and said sealing retainer ring recess walls having smooth surfaces in contact with the ring whereby swiveling motion is accommodated between the pipe and the sealing retainer ring without injury to the sealer.

2. In a pipe coupling, a removable flange connection, comprising a pipe section having a pair of opposed grooves in the surface thereof and near one end thereof, the grooves being limited in length to leave a large portion of the pipe section of full pipe thickness, a thrust flange ring positioned over the end of the pipe section beyond the groove and adjacent thereto, a sealing retainer ring fitting over the pipe and against the thrust flange ring, coacting means between said sealer retaining ring and thrust flange sealing retainer ring and thrust flange ring, a key assembly fitting in the grooves and within the annular space, said sealing retainer ring having walls defining an annular recess adjacent the end of the pipe, and a generally ring-shaped sealer composed of resilient material fitting over the pipe in close contact therewith and within the recess in the sealing retainer ring in contact with the walls of the retainer ring, said sealer having a tear-shaped cross-section with the pointed end of the tear-shaped cross-section facing said one end.

3. The removable flange connection defined in claim 2, in which the sealing retainer ring is formed with the annular recess defined between the pipe and the retainer substantially rectangular in cross-section and open at one end, with the open end being beveled to increase the size of the recess at the open end.

4. The removable flange connection defined in claim 3, in which the sealer is constructed with the pointed end of the tear conforming with the outside diameter of the pipe so that the sealer presents a flat surface in contact with the pipe.

5. The removable flange connection defined in claim 4, in which the sealer has a radial thickness larger than the radial dimension of the inner end of the annular recess in the sealing retainer ring but smaller than the radial dimension of the open end whereby it is squeezingly held in position within the recess with the squeezing action being provided by the pipe wall and the walls defining the recess during assembly of the flange connection.

6. In a pipe coupling, a removable flange connection, comprising a pipe section having a pair of opposed grooves in the surface thereof and near one end thereof, the grooves being limited in length to leave a large portion of the pipe section of full pipe thickness, a thrust flange ring positioned over the end of the pipe section beyond the groove and adjacent thereto, a sealing retainer ring fitting over the pipe and against the thrust flange ring contact therewith, said retainer ring having walls defining an annular recess adjacent the end of said pipe, said sealer fitting within said annular recess defining an annular space at the junction of the sealing retainer ring and thrust flange ring, a key assembly fitting in the grooves and within the annular space, said key assembly containing a split ring and a pair of diametrically opposed keys secured to the split ring, said sealing retainer ring having walls defining an annular recess adjacent the end of the pipe, and a generally ring-shaped sealer composed of resilient material fitting over the pipe in close contact therewith and within the recess in the sealing retainer ring in contact with the walls of the retainer ring, said sealer having a tear-shaped cross-section with the pointed end of the tear-shaped cross-section facing said one end.

References Cited

UNITED STATES PATENTS

| 2,822,191 | 2/1958 | Risley et al. | |
| 2,874,981 | 2/1959 | Brady. | |
| 1,851,574 | 3/1932 | Fiederlein | 285—412 X |
| 2,245,153 | 6/1941 | McWane | 277—207 |
| 2,535,694 | 12/1950 | Payne | 285—368 |
| 2,867,454 | 1/1959 | Pollia | 285—368 |
| 2,085,820 | 4/1963 | Pollia | 285—368 |

FOREIGN PATENTS

| 511,720 | 8/1939 | Great Britain. |
| 277,647 | 9/1930 | Italy. |

CARL W. TOMLIN, *Primary Examiner.*

D. W. AROLA, *Assistant Examiner.*